(12) United States Patent
Lee (10) Patent No.: US 7,969,545 B2
(45) Date of Patent: Jun. 28, 2011

(54) LIQUID CRYSTAL DISPLAY AND MANUFACTURING METHOD THEREOF

(75) Inventor: Myoung Ho Lee, Gyeongii-do (KR)

(73) Assignee: LG Display Co., Ltd., Seoul (KR)

( * ) Notice: Subject to any disclaimer, the term of this patent is extended or adjusted under 35 U.S.C. 154(b) by 581 days.

(21) Appl. No.: 11/137,325

(22) Filed: May 26, 2005

(65) Prior Publication Data
US 2005/0264723 A1     Dec. 1, 2005

(30) Foreign Application Priority Data

May 28, 2004   (KR) .................. 10-2004-0038449

(51) Int. Cl.
G02F 1/1339     (2006.01)
G02F 1/1333     (2006.01)

(52) U.S. Cl. ................ 349/155; 349/110; 349/190
(58) Field of Classification Search .......... 349/106, 349/155, 156, 110, 190
See application file for complete search history.

(56) References Cited

U.S. PATENT DOCUMENTS

| | | | | |
|---|---|---|---|---|
| 5,212,575 A * | 5/1993 | Kojima et al. | ............... | 349/147 |
| 6,339,461 B1 * | 1/2002 | Kashiwazaki et al. | ........ | 349/155 |
| 6,396,559 B1 * | 5/2002 | Kishimoto et al. | ............ | 349/156 |
| 6,724,447 B2 * | 4/2004 | Kim | ............................... | 349/106 |
| 6,795,141 B2 * | 9/2004 | Yamada | ........................ | 349/106 |
| 6,924,871 B2 * | 8/2005 | Washizawa et al. | .......... | 349/156 |
| 7,123,333 B2 * | 10/2006 | Lee et al. | ...................... | 349/156 |
| 7,428,033 B2 * | 9/2008 | Choi et al. | ..................... | 349/155 |
| 2003/0112405 A1 * | 6/2003 | Kim et al. | ..................... | 349/156 |
| 2004/0114090 A1 * | 6/2004 | Washizawa et al. | .......... | 349/158 |
| 2004/0141142 A1 * | 7/2004 | Choi et al. | ..................... | 349/155 |
| 2005/0146669 A1 * | 7/2005 | Yeh et al. | ...................... | 349/141 |

FOREIGN PATENT DOCUMENTS

KR       2001-49941       6/2001

* cited by examiner

Primary Examiner — Nathanael R Briggs
(74) Attorney, Agent, or Firm — Morgan, Lewis & Bockius LLP (57) ABSTRACT

A method for manufacturing a liquid crystal display device includes forming a black matrix layer on a first substrate, forming a groove on the first substrate, forming a color filter layer having a red resin, a green resin, and a blue resin on the first substrate, forming a common electrode on the color filter layer, and disposing spacers on the first substrate.

6 Claims, 9 Drawing Sheets

FIG. 1

RELATED ART

POSITION OF SPACER AFTER DRYING PROCESS

LIQUID CRYSTAL DISPLAY AND MANUFACTURING METHOD THEREOF

The present invention claims priority to Korean Patent Application No. 38449/2004, filed in Korea on May 28, 2004, which is hereby incorporated by reference.

BACKGROUND OF THE INVENTION

1. Field of the Invention

The present invention relates to a liquid crystal display device, and more particularly, to a liquid crystal display device that can maintain a uniform cell gap and prevent light leakage and a manufacturing method thereof.

2. Description of the Related Art

A cathode ray tube (CRT) device is advantageous with regard to performance and price, but is disadvantageous with regard to size and portability. In contrast, a liquid crystal display (LCD) device is advantageous with regard to size, weight, and power consumption, and is future replacement for replacing the CRT devices. In addition, the LCD device is commonly used as a display for most information processing devices.

Figure 1:
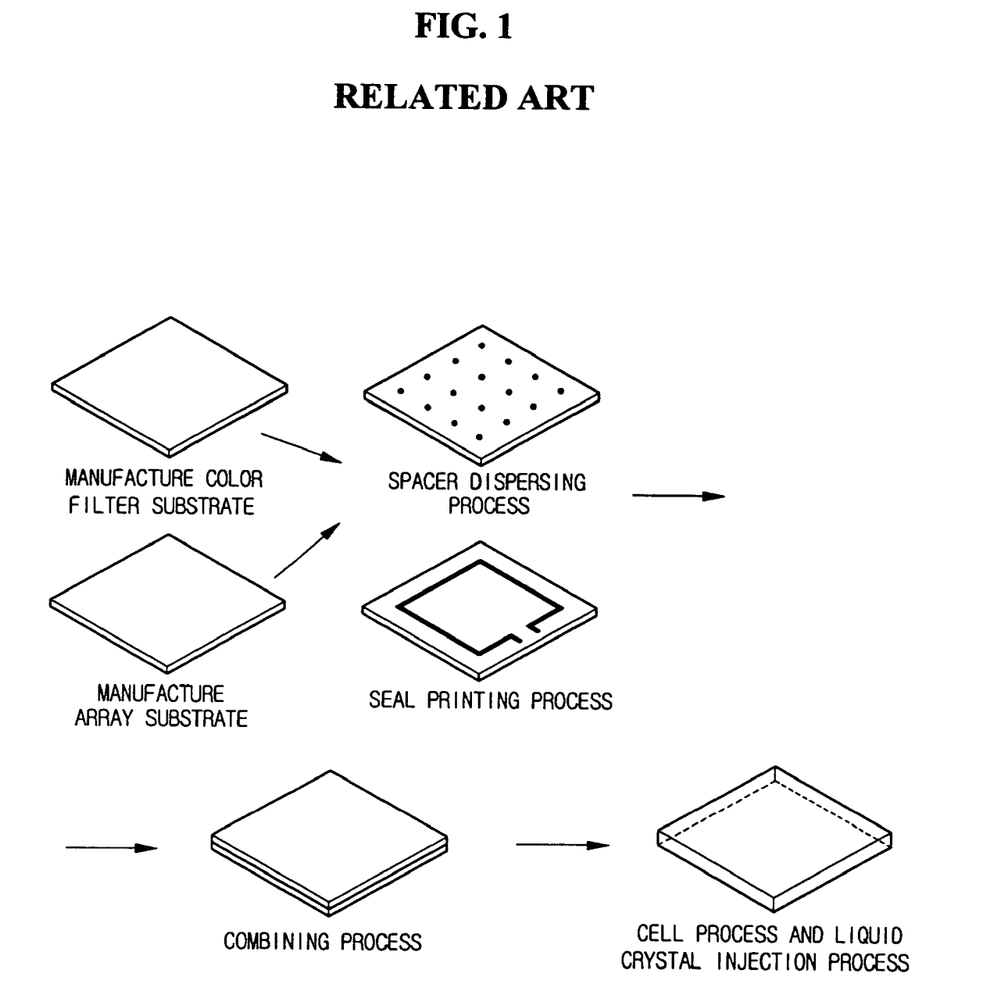
FIG. 1 is a schematic perspective view of a LCD manufacturing process according to the related art.

FIG. 1 is a schematic perspective view of a LCD manufacturing process according to the related art. In FIG. 1, a plurality of pixels are formed in a matrix configuration through an array substrate manufacturing process, and a color filter layer is formed through a color filter manufacturing process. Then, the array substrate and the color filter layer are combined together. During the combining process, spacers are dispersed on the color filter for maintaining a uniform cell gap, and a seal line is printed on the array substrate for maintaining a cell gap and encapsulating liquid crystal material between the array substrate and the color filter layer. After the spacer dispersing process and the seal printing process, the surface of the color filter upon which the spacers are dispersed is disposed to face the surface of the array substrate's upon which the seal line is printed on, and then the two substrates are combined together by exposure to heat, pressure, and ultraviolet (UV) rays. Thereafter, a cell process for cutting the combined substrates into a size of a liquid crystal panel is executed, and a liquid crystal injection process for injecting and encapsulating the liquid crystal is performed. Although not shown in FIG. 1, a module process for assembling a gate PCD and a data PCD is performed after the liquid crystal injection process.

Figure 2:
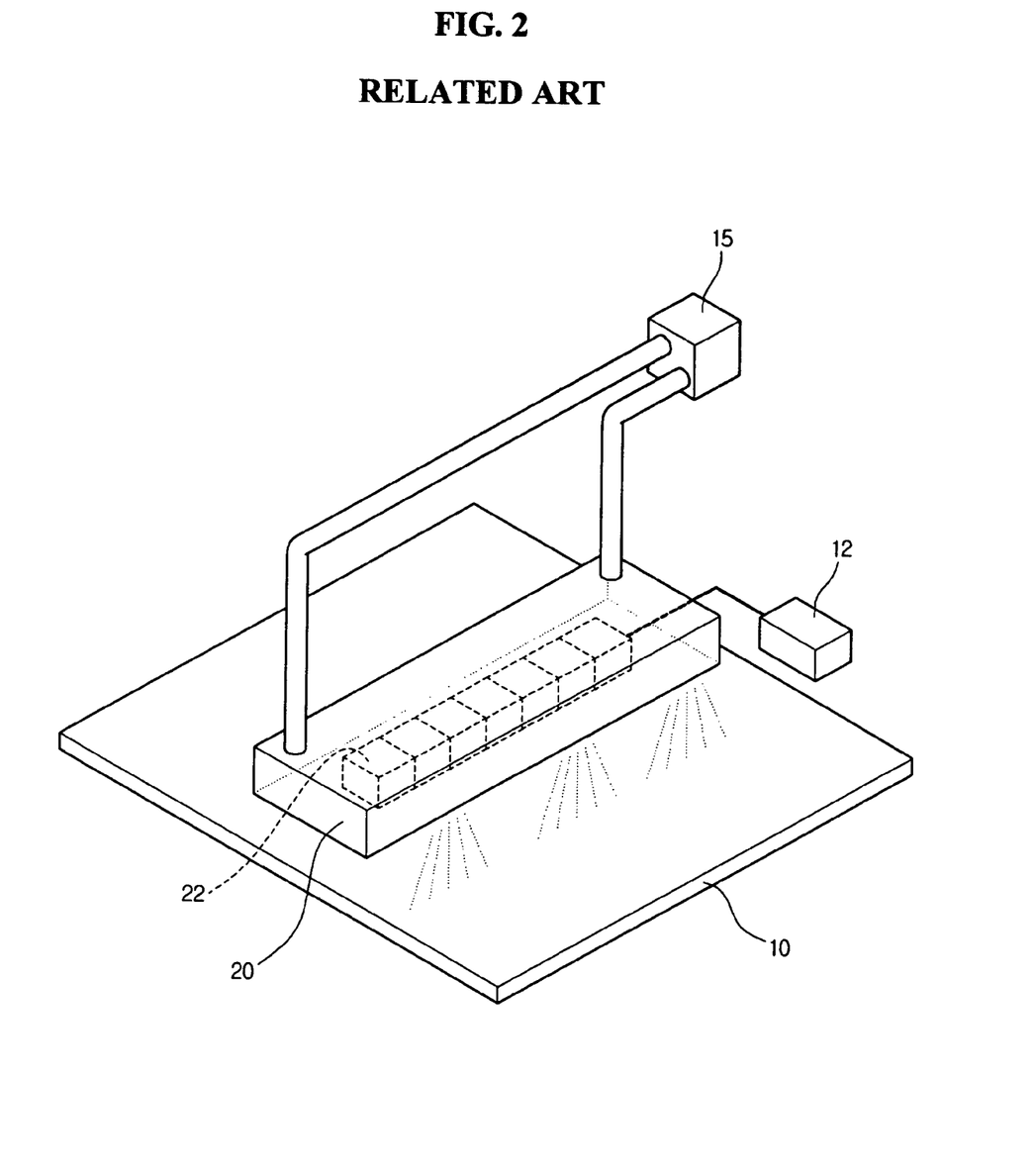
FIG. 2 is a schematic perspective view of a process for dispersing spacers on a color filter according to the related art.

FIG. 2 is a schematic perspective view of a process for dispersing spacers on a color filter according to the related art. In FIG. 2, ink containing spacers are dispersed on a color filter 10 using an inkjet device. In the inkjet device, a supply unit 15 for supplying ink containing spacers to an inkjet head 20 is connected to the inkjet head 20, and the inkjet head 20 has a plurality of spray nozzles 22 disposed therein. In addition, the spray nozzles 22 are connected to a control unit 12 for adjusting a spray operation.

The spacers are dispersed by the inkjet device using the following method. First, when ink containing spacers are supplied from the supply unit 15 to the inkjet head 20, the inkjet head 20 sprays the supplied ink on the color filter 10 through the spray nozzles 22. At this time, ink droplets containing spacers are sprayed through the spray nozzles 22 on the color filter 10 at desired positions according to a control signal supplied from the control unit 12.

Figure 3:
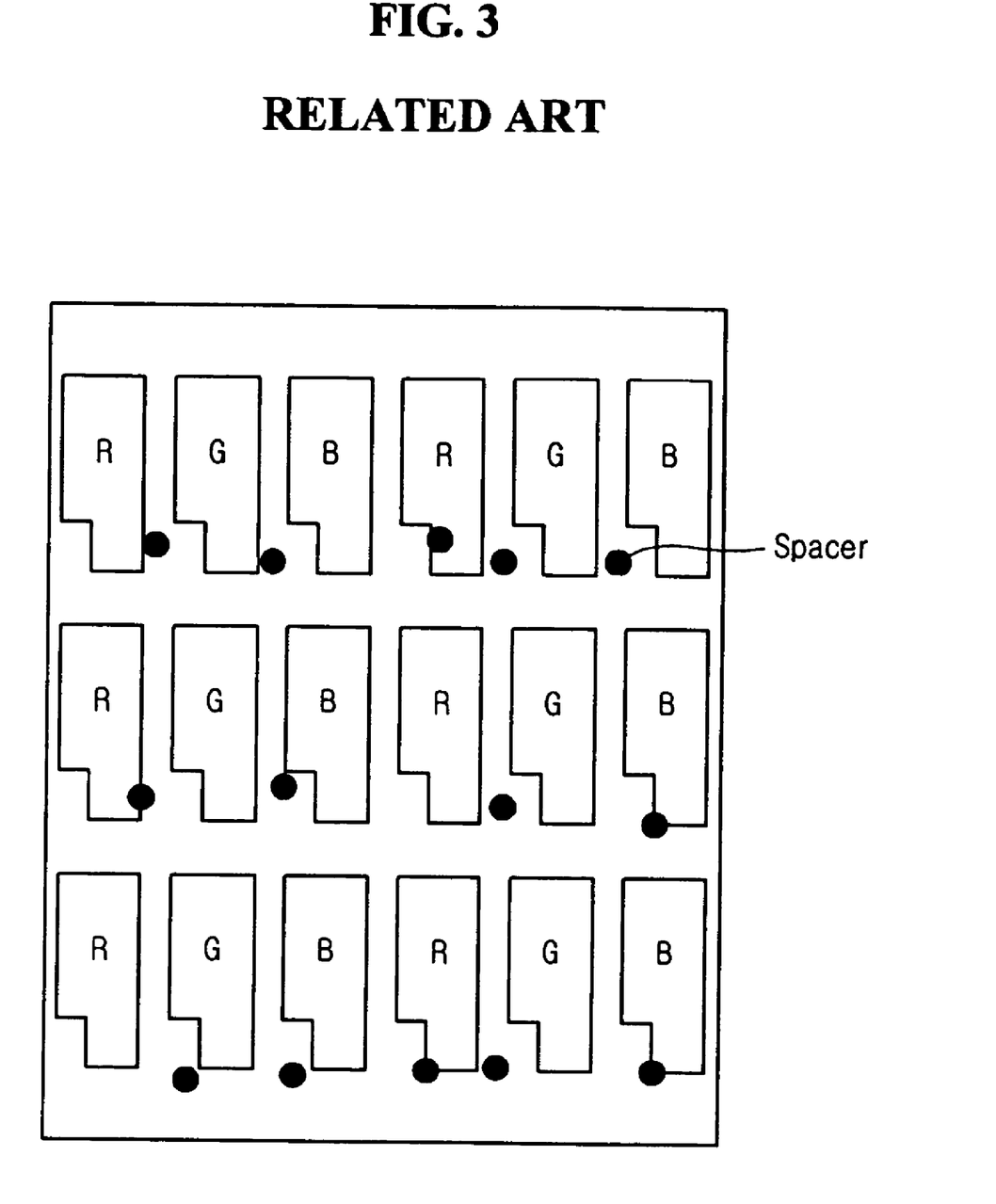
FIG. 3 is a plan view of spacers dispersed on a color filter according to the related art.

FIG. 3 is a plan view of spacers dispersed on a color filter according to the related art. In FIG. 3, when ink droplets mixed with spacers (indicated by black points) are dispersed using the inkjet technique, the ink droplets can be dispersed at approximately-desired positions on a color filter. Accordingly, the sprayed spacers are connected with an array substrate to maintain a cell gap between two substrates. However, the spacers are disposed not only on a non-display region (a black matrix) but also on a display region (a color filter layer) of the color filter. That is, the spacers are non-uniformly dispersed on R/G/B color filter layers and a black matrix region.

When the spacers are disposed on the color filter layer (the display region), an aperture ratio of a pixel region is deteriorated and light is leaked after it is dispersed by the spacers disposed on the display region. The spacers can be disposed on the display region because their positions are varied as an ink droplet containing them is dried.

Figure 4:
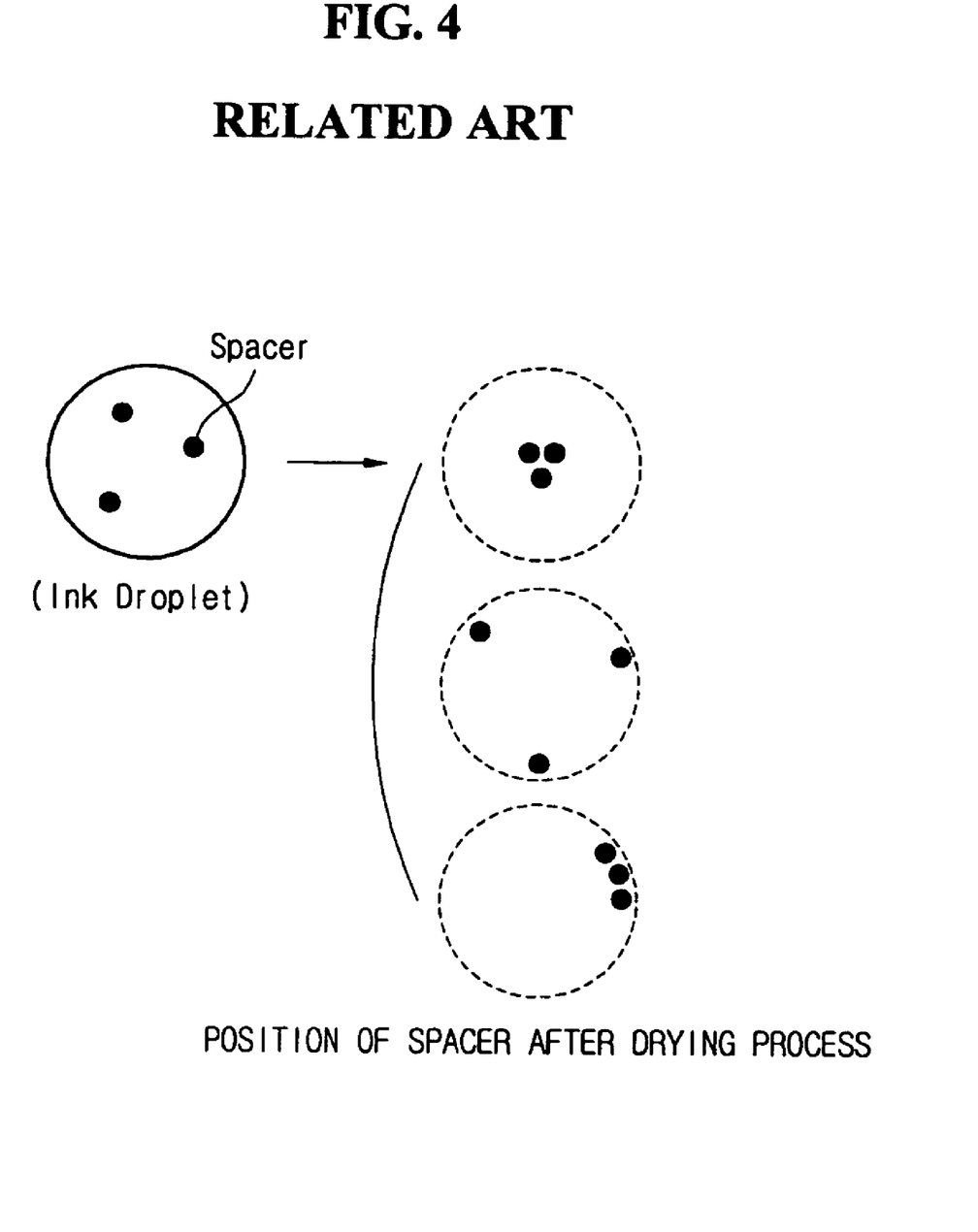
FIG. 4 is a plan view of exemplary spacer positions after an ink droplet mixed with the spacers is dried according to the present invention.

FIG. 4 is a plan view of exemplary spacer positions after an ink droplet mixed with the spacers is dried according to the present invention. In FIG. 4, when an ink droplet containing spacers is dropped onto the color filter, only the spacers remaining on the color filter after the ink droplet dry. At this time, the spacers are gathered either around the center of the ink droplet or at the circumference thereof. Accordingly, this causes a non-uniform dispersion of the spacers. Particularly, since the ink droplet is 60 μM or larger in diameter, the spacers are apt to be disposed at the R/G/G color filter layers, that is, at undesirable positions.

SUMMARY OF THE INVENTION

Accordingly, the present invention is directed to a liquid crystal display device and a manufacturing method thereof that substantially obviate one or more problems due to limitations and disadvantages of the related art.

An object of the present invention is to provide a liquid crystal display and a manufacturing method thereof, which can improve an aperture ratio and prevent light leakage by forming fixing grooves for fixing spacers on a color filter and then disposing dispersed spacers on the fixing grooves.

Additional advantages, objects, and features of the invention will be set forth in part in the description which follows and in part will become apparent to those having ordinary skill in the art upon examination of the following or may be learned from practice of the invention. The objective and other advantages of the invention may be realized and attained by the structure particularly pointed out in the written description and claims hereof as well as the appended drawings.

To achieve these objective and other advantages and in accordance with the purpose of the invention, as embodied and broadly described herein, a method for manufacturing a liquid crystal display device includes forming a black matrix layer on a first substrate, forming a groove on the first substrate, forming a color filter layer having a red resin, a green resin, and a blue resin on the first substrate, forming a common electrode on the color filter layer, and disposing spacers on the first substrate.

In another aspect of the present invention, a liquid crystal display device includes a first substrate, a black matrix on the first substrate, the black matrix having a light transmittance region and a light shielding region, a color filter layer on the light transmittance region and a part of the light shielding region, and a groove on the light shielding region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 5:
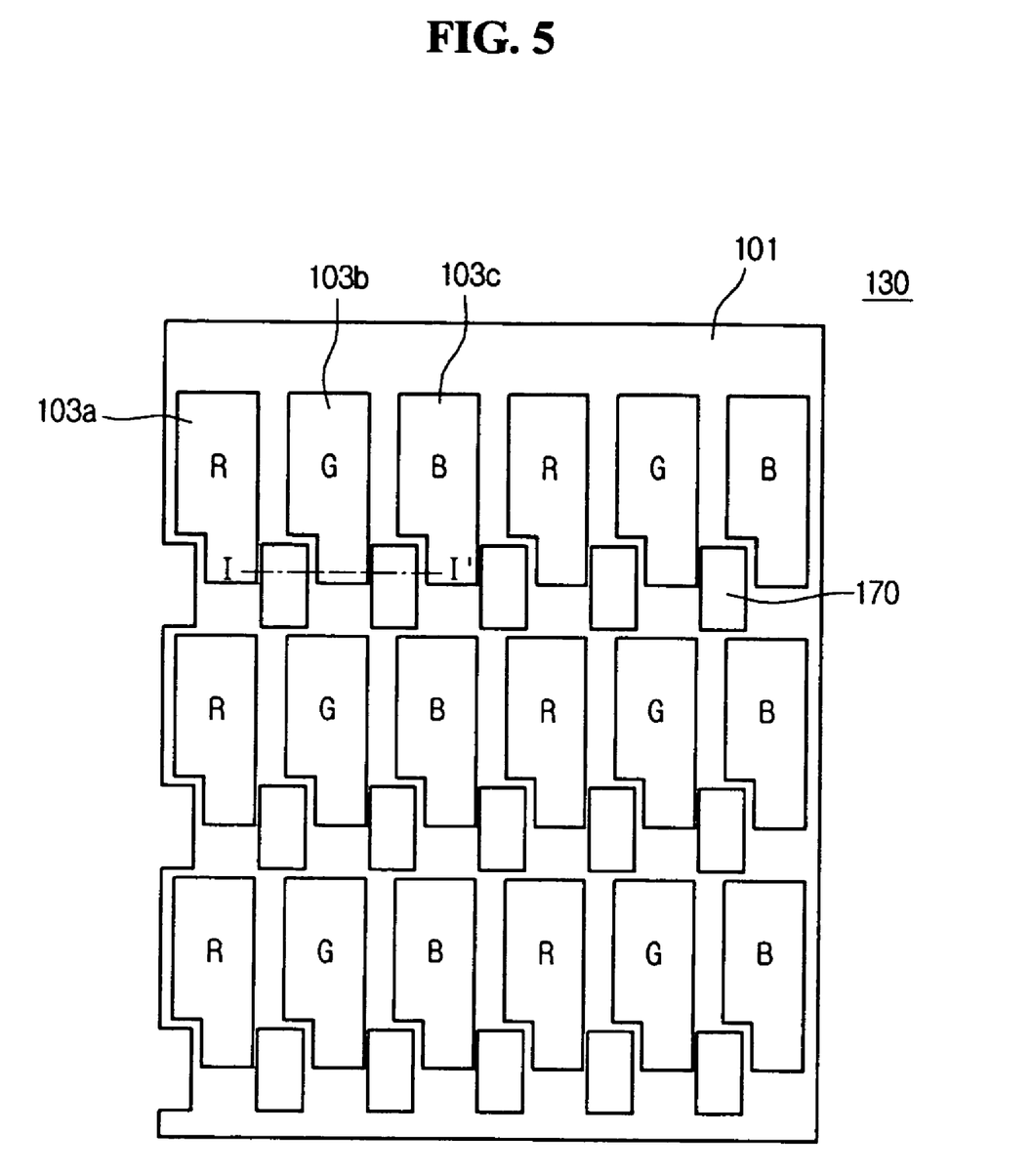
FIG. 5 is a plan view of an exemplary color filter on which fixing grooves are formed at positions where spacers are to be dispersed according to the present invention.

FIG. 5 is a plan view of an exemplary color filter on which fixing grooves are formed at positions where spacers are to be dispersed according to the present invention. In FIG. 5, square fixing grooves 170 are formed on a color filter 130 upon which red/green/blue (R/G/B) color filter layers 103a, 103b, and 103c are formed. The fixing groove 170 is formed in a black matrix region 101 at a position where a spacer is to be dispersed. More specifically, a TFT region 101 is formed on an array substrate, and the fixing groove 170 is formed in the black matrix region 101 on the color filter 130 at a position corresponding to the TFT region 101. Here, the fixing groove 170 is used for fixing the spacer on the black matrix region, and may also be formed in a black matrix region at a position corresponding to a gate line or a data line.

As shown in FIG. 5, the fixing groove 170 may be formed to have a shape of a circle, an ellipse, or a triangle, as well as a square. In addition, the fixing groove 170 may be formed in a TFT region, a gate line region or a data line region on the array substrate, as well as on the color filter 130.

Figure 6:
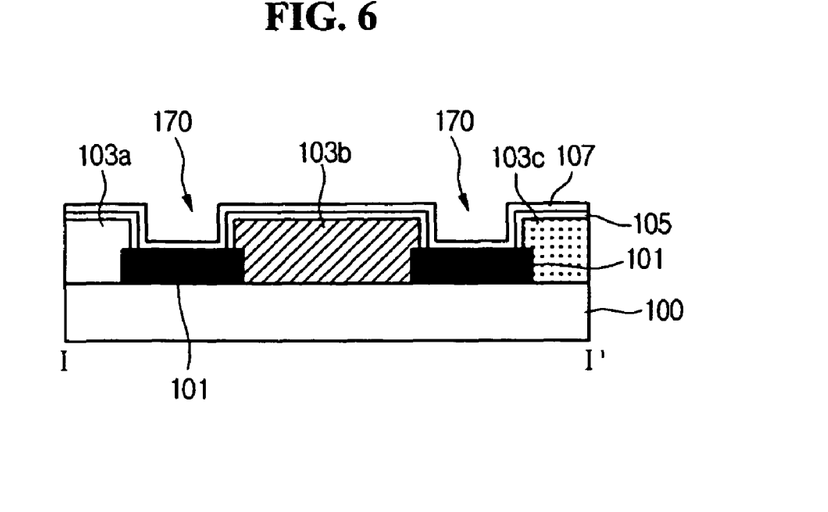
FIG. 6 is a cross sectional view along I-I' of FIG. 5 according to the present invention.

FIG. 6 is a cross sectional view along I-I' of FIG. 5 according to the present invention. In FIG. 6, black matrixes 101 are formed on a transparent insulating substrate 100, and R/G/B color filter layers 103a, 103b, and 103c are formed on the substrate 100 upon which the black matrixes 101 has been formed. At this time, the color filter layers are patterned so that they are not arranged on the black matrixes 101 upon which the fixing grooves 170 are to be formed. Then, a overcoat layer 105 and a common electrode 107 are sequentially formed on the substrate 100 on which the filer layers 103a, 103b, and 103c and the black matrixes 101 have been formed. Although not shown, the fixing grooves may also be formed by forming an overcoat layer on the R/G/B color filter layers 103a, 103b, and 103c and then patterning the formed overcoat layer.

Figure 7:
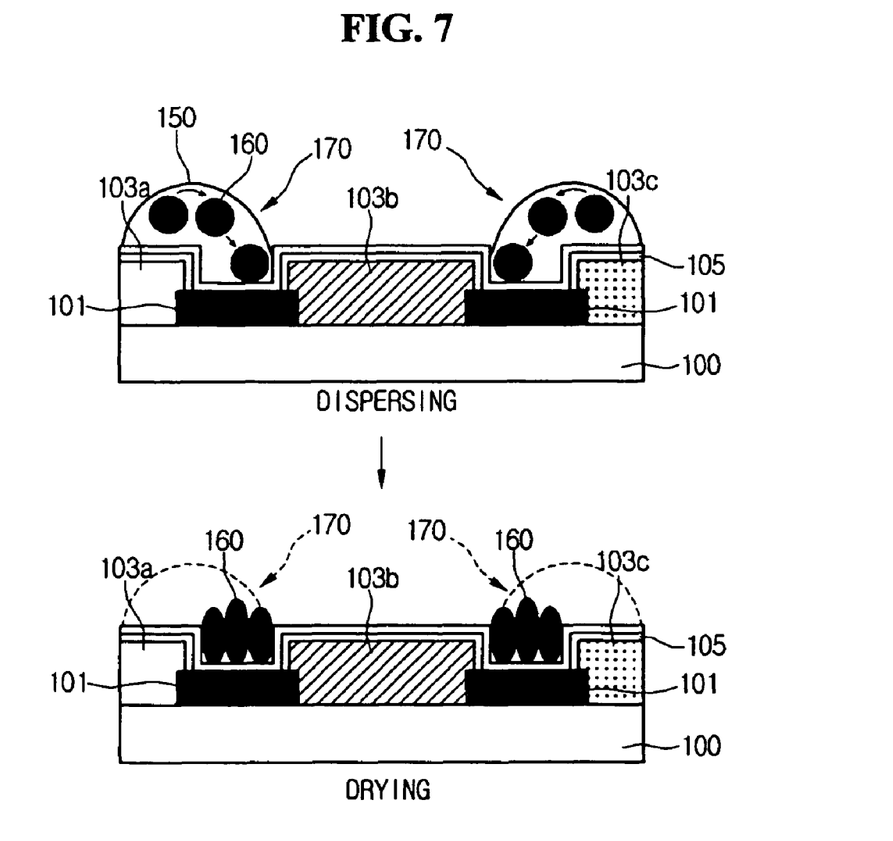
FIG. 7 are cross sectional views of an exemplary process in which spacers are arranged after an ink droplet mixed with the spacers is dispersed and dried according to the present invention.

FIG. 7 are cross sectional views of an exemplary process in which spacers are arranged after an ink droplet mixed with the spacers is dispersed and dried according to the present invention. In FIG. 7, when an ink droplet 150 mixed with spacers 160 is dispersed on a fixing groove 170 according to an inkjet method, the ink droplet 150 is moved into the fixing groove 170 along a stepped portion thereof. When the ink droplet 150 is moved into the fixing groove 170, the spacers 160 contained in the ink droplet 150 are also gathered into the fixing groove 170. Accordingly, since the ink droplet 150 is gathered into the fixing groove 170 and then dried, the spacers of the ink droplet 150 can be exactly dispersed in the fixing groove 170.

As shown in FIG. 7, although the ink droplet 150 mixed with the spacers 160 are not dispersed on the fixing groove 170, the ink droplet 150 is moved into the fixing groove 170 by a stepped portion thereof. Accordingly, as the ink droplet 150 is moved into the fixing groove 170, the spacers 160 contained in the ink droplet 150 are also moved into the fixing groove 170. At this time, the spacer 160 is inserted into the groove 170 by a stepped portion thereof. Accordingly, the spacer 160 is preferably formed to have a diameter lager than that of a related art spacer. Consequently, the spacers 160 can be arranged at desired positions while maintaining a cell gap similar to the related art.

Figure 8:
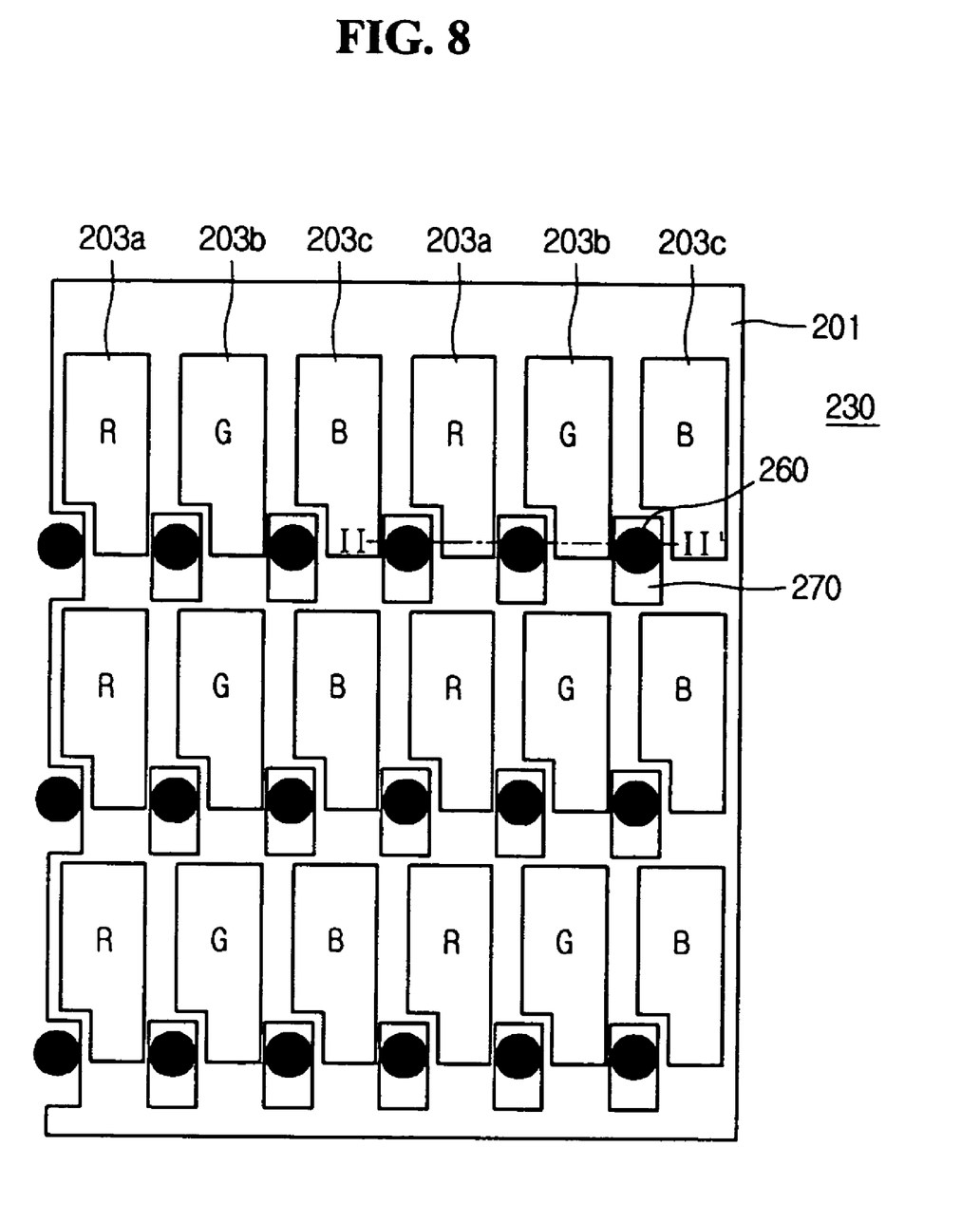
FIG. 8 is a plan view of an exemplary spacer dispersion on a color filter according to the present invention.

FIG. 8 is a plan view of an exemplary spacer dispersion on a color filter according to the present invention. In FIG. 8, since spacers 260 are arranged to fill square fixing grooves 270 formed on a color filter 230, a problem of the spacers is that they are non-uniformly disposed and dispersed also on color filter layers 203a, 203b, and 203c can be prevented. Here, the fixing groove 270 may also be formed to have a shape of a circle, an ellipse or triangle, as well as a square. In addition, if an overcoat layer is coated on the color filter 230, the fixing groove 270 is formed by patterning the formed overcoat layer. Alternatively, when an overcoat layer is not formed on the color filter 230, the fixing groove 270 is formed by exposing a portion on the black matrix during the forming of the color filter layer.

Figure 9A:
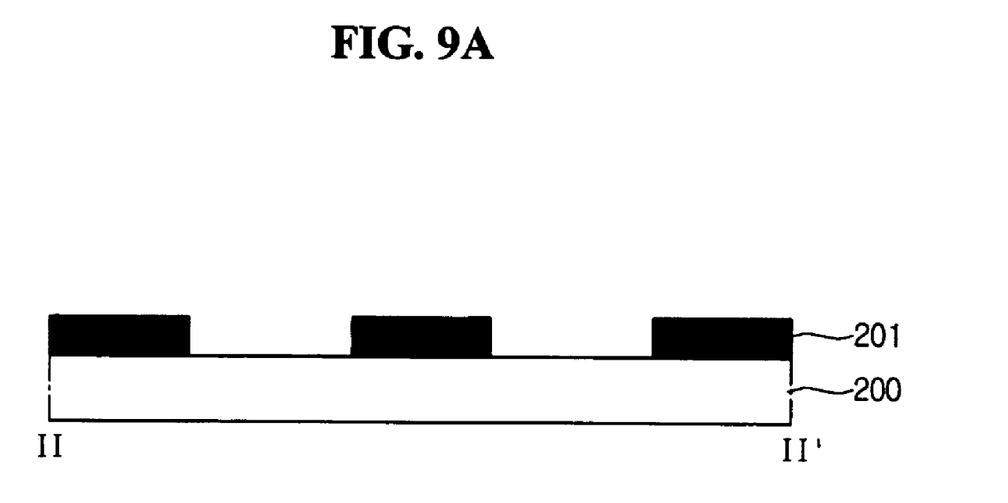
FIGS. 9A through 9D are cross sectional views along II-II' of FIG. 8 of an exemplary manufacturing process for a color filter according to the present invention.

FIGS. 9A through 9D are cross sectional views along II-II' of FIG. 8 of an exemplary manufacturing process for a color filter according to the present invention. In FIG. 9A, after chrome or plastic material is deposited on an insulating substrate 200, a black matrix 201 is formed on the insulating substrate 200.

Figure 9B:
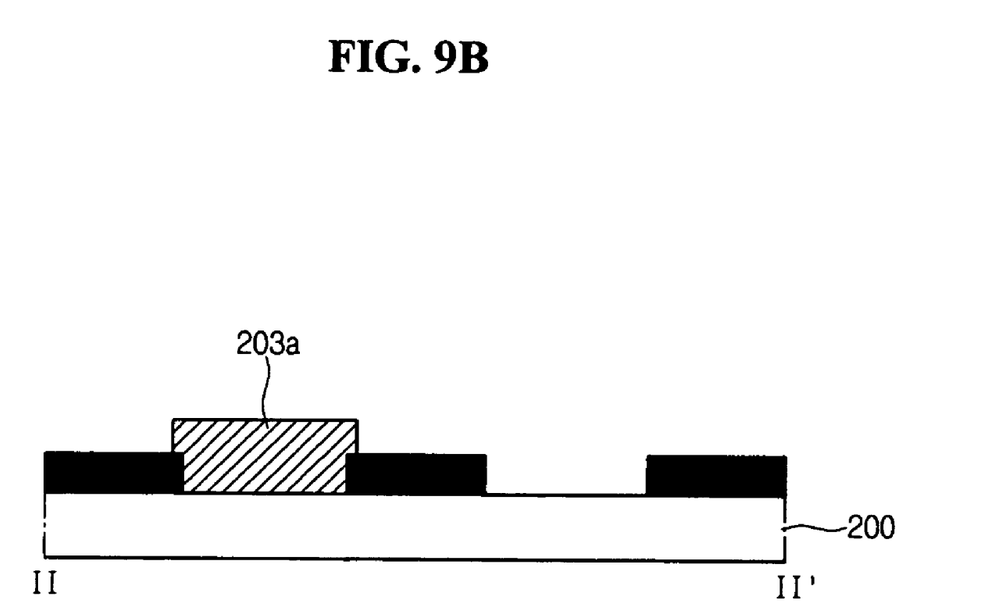

In FIG. 9B, red resin is coated on the insulating substrate 200 on which the black matrix 201 is formed, and a red (R) color filter layer 203A is formed through an exposing and developing process for the resulting structure. Then, a green (G) color filter layer and a blue (B) color filter layer are also formed in a similar manner. When the R color filter layer 203A is formed, the insulating substrate 200 of the black matrix 201 is formed at an opened space. In addition, both edge regions of the R color filter layer 203A are partially overlapped with both edge regions of the black matrix 201. That is, the R color filter layer 203A is formed such that a center region of the black matrix 201 can be exposed. Thereafter, the G color filter layer and the B color filter layer are also formed in the same manner so that a fixing groove having a predetermined stepped portion is formed on the black matrix 201.

Figure 9C:
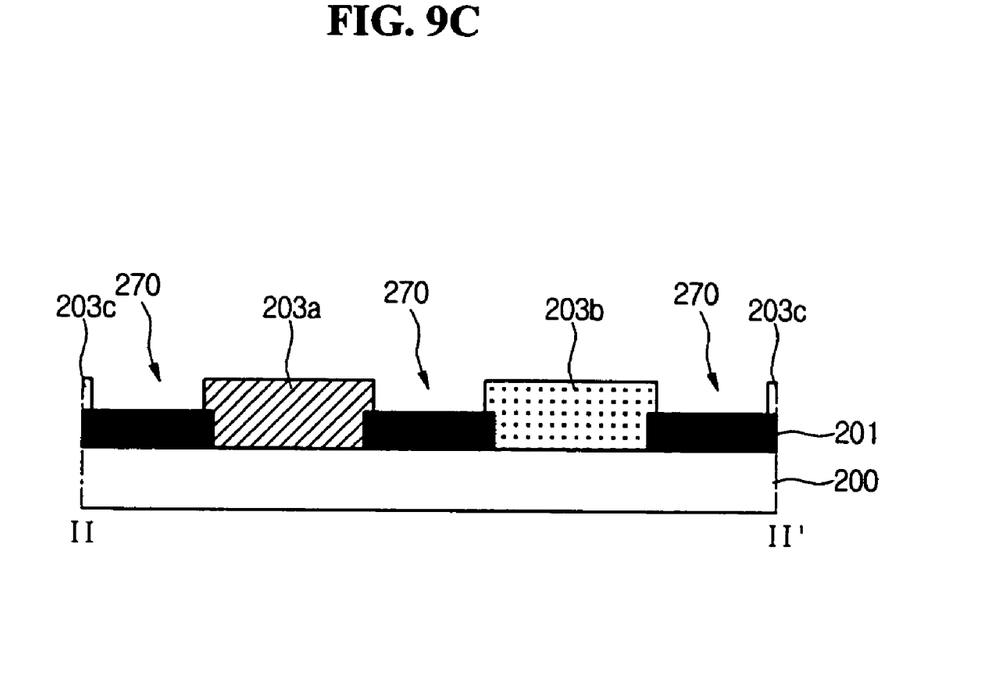

In FIG. 9C, a fixing groove 270 is formed in such a way that the both edge regions of the color filter are spaced apart from each other by a predetermined distance on the black matrix 201 and a center region of the black matrix 201 is opened. Accordingly, the fixing groove 270 is formed to have a stepped portion as high as a color filter near the black matrix 201.

Figure 9D:
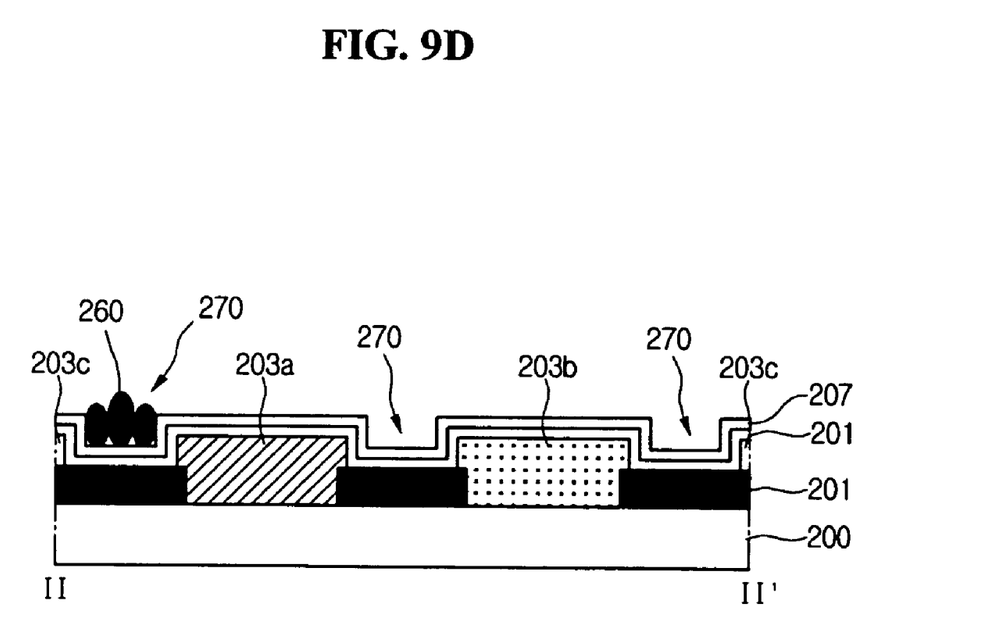

In FIG. 9D, a overcoat layer 205 is formed on the insulating layer 200, and then a common electrode 207 is formed by depositing an ITO metal layer. Although not shown, if an overcoat layer is formed on the uppermost layer of the color filter layer, the fixing grooves for fixing the spacers are not formed during the forming of the R/G/B color filter layers. Alternatively, the fixing groove is formed in the black matrix region by patterning the overcoat layer.

As described above, the fixing grooves for a uniform cell gap are formed on the color filter layer at positions corresponding to the spacers that are to be dispersed. Accordingly, the spacers can be uniformly dispersed, an aperture ratio can be improved, and light leakage can be prevented.

It will be apparent to those skilled in the art that various modifications and variations can be made in the liquid crystal display of the present invention without departing from the spirit or scope of the invention. Thus, it is intended that the present invention cover the modifications and variations of this invention provided they come within the scope of the appended claims and their equivalents.

What is claimed is:

1. A method for manufacturing a liquid crystal display device, comprising:
   forming a black matrix layer on a first substrate;
   forming a groove on the first substrate;
   forming a color filter layer having a red resin, a green resin, and a blue resin on the first substrate;
   forming an overcoat layer on the first substrate;
   forming a common electrode on the overcoat layer;
   dispersing an ink droplet mixed with a plurality of spacers on the groove using an inkjet method;
   forming a thin film transistor, a gate line and a data line on a second substrate; and
   forming a liquid crystal layer between the first and second substrates,
      wherein the groove is formed at a position corresponding to a TFT region which is located where the gate line and the date line intersect,
      wherein the common electrode and the plurality of spacers are formed on the black matrix layer,
      wherein the common electrode and the overcoat layer are formed on the color filter layer, and the common electrode covers side and the upper surface of the color filter layer,
      wherein the common electrode is contacted to the overcoat layer corresponded to the upper surface of the color filter layer and the black matrix layer in the groove,
      wherein the groove is formed by patterning the overcoat layer,
      wherein dispersing the ink droplet mixed with the plurality of spacers on the groove using an inkjet method includes,
         moving the ink droplet into the groove along a stepped portion of the groove;
         gathering the plurality of spacers contained in the ink droplet into the groove, and
         drying the plurality of spacers in the groove.

2. The method according to claim 1, wherein the groove is formed on the first substrate corresponding to at least one of a gate line and a data line on the second substrate.

3. The method according to claim 1, wherein the groove has a shape including one of a square, a circle, and an ellipse.

4. A liquid crystal display device, comprising:
   a first substrate;
   a black matrix on the first substrate, the black matrix having a light transmittance region and a light shielding region;
   a color filter layer on the light transmittance region and a part of the light shielding region;
   a groove on the light shielding region;
   an overcoat layer on the color filter layer;
   a common electrode on the overcoat layer and the black matrix;
   an ink droplet mixed with a plurality of spacers in the groove using an inkjet method;
   a thin film transistor, a gate line and a data line on a second substrate; and
   a liquid crystal layer between the first and second substrates,
      wherein the groove is formed at a position corresponding to a TFT region which is located where the gate line and the date line intersect,
      wherein the common electrode and the plurality of spacers are formed on the black matrix layer,
      wherein the common electrode and the overcoat layer are formed on the color filter layer, and the common electrode covers side and the upper surface of the color filter layer,
      wherein the common electrode is contacted to the overcoat layer corresponded to the upper surface of the color filter layer and the black matrix layer in the groove,
      wherein the groove is formed by patterning the overcoat layer,
      wherein the ink droplet mixed with the plurality of spacers on the groove using an inkjet method includes,
         moving the ink droplet into the groove along a stepped portion of the groove;
         gathering the plurality of spacers contained in the ink droplet into the groove, and
         drying the plurality of spacers in the groove.

5. The device according to claim 4, wherein the groove has a shape including one of a circle, a square, a triangle, and an ellipse.

6. The device according to claim 4, wherein the groove is formed on first substrate corresponding to at least one of a gate line and a data line on the second substrate.

* * * * *